United States Patent
Hallin et al.

(10) Patent No.: US 7,240,194 B2
(45) Date of Patent: Jul. 3, 2007

(54) SYSTEMS AND METHODS FOR DISTRIBUTING TRUSTED CERTIFICATION AUTHORITIES

(75) Inventors: Philip J. Hallin, Redmond, WA (US); John J. Lambert, Seattle, WA (US); Klaus U. Schutz, Kirkland, WA (US); Sunil Pai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/104,978

(22) Filed: Mar. 22, 2002

(65) Prior Publication Data

US 2003/0182549 A1    Sep. 25, 2003

(51) Int. Cl.
*H04L 9/00* (2006.01)
(52) U.S. Cl. .......................................... 713/156; 726/2
(58) Field of Classification Search ................ 713/156, 713/200, 201, 1, 2, 188, 194; 380/255, 277, 380/200, 201; 709/227, 228; 726/2
See application file for complete search history.

(56) References Cited

U.S. PATENT DOCUMENTS

| | | | |
|---|---|---|---|
| 5,621,797 A * | 4/1997 | Rosen | 705/76 |
| 5,717,757 A | 2/1998 | Micali | |
| 5,949,877 A | 9/1999 | Traw et al. | |
| 6,058,484 A | 5/2000 | Chapman et al. | |
| 6,094,485 A | 7/2000 | Weinstein et al. | |
| 6,128,740 A | 10/2000 | Curry et al. | |
| 6,134,550 A | 10/2000 | Van Oorschot et al. | |
| 6,134,551 A | 10/2000 | Aucsmith | |
| 6,226,743 B1 | 5/2001 | Naor et al. | |
| 6,301,658 B1 | 10/2001 | Koehler | |
| 6,301,659 B1 | 10/2001 | Micali | |
| 6,308,277 B1 | 10/2001 | Vaeth et al. | |
| 6,367,013 B1 | 4/2002 | Bisbee et al. | |
| 6,370,249 B1 | 4/2002 | Van Oorschot | |
| 6,421,781 B1 | 7/2002 | Fox et al. | |
| 6,430,688 B1 | 8/2002 | Kohl et al. | |
| 6,438,550 B1 | 8/2002 | Doyle et al. | |
| 6,442,688 B1 | 8/2002 | Moses et al. | |
| 6,463,534 B1 | 10/2002 | Geiger et al. | |

(Continued)

OTHER PUBLICATIONS

"The AIS Login Mechanism" web pages—CERN—European Laboratory for Particle Physics, Administrative Informatin Services, 5 pages, Jun. 2001.

(Continued)

*Primary Examiner*—Hosuk Song
*Assistant Examiner*—Joseph Pan

(57) ABSTRACT

Systems and methods are described for distributing and updating trusted certification authorities to computer systems and users. When a digital certificate is encountered during a secured electronic transaction, the root authority of the certificate is determined. It is then determined whether the root authority is a trusted authority by attempting to locate the root authority in a trusted root list. If the root authority is not included in the trusted root list, a remote site is accessed and an updated version of the trusted root list is downloaded. The new trusted root list is checked for the presence of the encountered certificate and, if found, the transaction is allowed to proceed. In one implementation, the entire trusted root list is not downloaded. Instead, if an appropriate digital certificate is located, then the certificate is downloaded and added to the trusted root list of the computer system. The transaction may then proceed.

31 Claims, 3 Drawing Sheets

U.S. PATENT DOCUMENTS

| | | |
|---|---|---|
| 6,487,658 B1 | 11/2002 | Micali |
| 6,513,116 B1 | 1/2003 | Valente |
| 6,636,975 B1 | 10/2003 | Khidekel et al. |
| 6,671,803 B1 | 12/2003 | Pasieka |
| 6,816,900 B1 | 11/2004 | Vogel et al. |
| 2001/0016877 A1 | 8/2001 | Dancs et al. |
| 2001/0051996 A1* | 12/2001 | Cooper et al. .............. 709/217 |
| 2002/0152382 A1 | 10/2002 | Xiao |

OTHER PUBLICATIONS

"PKCS #7: Cryptographic Message Syntax Standard," An RSA Laboratories Techincal Note, Version 1.5, Revised Nov. 1, 1993, pp. 1-30 (RSA ata Security, Inc. Public-Key Cryptography Standards (PKCS)).

Housley, et al. "Internet X.509 Public key Infrastructure Certified and CRL Profile," Standards Track, Jan. 1999, pp. 1-129.

* cited by examiner

SYSTEMS AND METHODS FOR DISTRIBUTING TRUSTED CERTIFICATION AUTHORITIES

TECHNICAL FIELD

The systems and methods described herein relate to system security. More particularly, the described invention relates to systems and methods for distributing and updating trusted certificate authorities.

BACKGROUND

Today, millions of computer users use all types of computers to shop online, trade stocks, made travel plans, etc., with the knowledge that their transactions are secure. Use of secure transactions has increased over the last few years with the use of the Internet.

Such secure transactions are due in large part to the user of digital certificates that are issued by certificate authorities. Users who participate in secure online transactions interact with digital identities, or certificates, that are tamper-proof digital documents that identify a person or a machine. Theoretically, anyone can create a digital identity claiming to be anybody else. But for secure transactions, digital identities must be issued by a trusted entity or organization.

If a computer operating system recognizes trusted authorities, it maintains of list of trusted certificate authorities. When a user encounters a certificate used in a secure transaction, the transaction may proceed if the operating system identifies the certificate as being issued by a trusted authority.

The certificate does not identify the trusted authority per se, but it must indicate that the trusted authority issued the certificate, because the trusted authority may also issue trusted certificates to other identities. Because a trusted authority is authorized to issue certificates to secondary authorities that may, in turn, issue certificates to other authorities, and so on, the trusted authority is also called a "certifying authority" or a "root authority."

Each issuing authority digitally signs the certificate of an entity that it authorizes so that all certificates emanating from a root authority are cryptographically secure. When a computer system attempts to verify a certificate, the digital signature may be read to identify the authority that issued it until the root authority from which the authorization originated can be identified. If the root authority is identified as a trusted authority, the certificate is verified as authentic.

If the operating system does not recognize the certificate as being issued by an authority that was ultimately approved by a root authority, then the transaction may be automatically terminated by the operating system. Alternatively, the user may receive a prompt giving the user an option to manually authorize the transaction or to abort the transaction. Such an out-of-band transaction to authorize a site is an inconvenience that is fundamentally unfair to legitimate sites that don't happen to be listed as an authorized site on a particular computer system.

The number of root authorities has increased with the growth of electronic transactions. This has presented a problem for manufacturers of operating systems that are configured to recognize trusted authorities in online transactions. When digital certificates were first coming into use, the number of root authorities did not increase very rapidly. It was simple to update a list of root authorities that were trusted by an operating system whenever a new version of the operating system (or an add-on service pack) was loaded into the host computer system.

However, since the number of requests by entities to be accepted as a root authority is increasing so rapidly, simply updating a trusted root authority list with operating system updates has become unacceptable. Also, since the trusted authority identification process is a process that a majority of users typically does not want to be bothered with, it is impractical to have users periodically obtain a new authority list, whether online or from a disk. A new process of updating a list of trusted authorities in a computer system must be virtually transparent to a user of the computer system in order to provide the most satisfying secure computing experience for the user.

Another problem that may occur with present systems and methods for distributing trusted root authorities is that sometimes a root authority may be compromised so that it can no longer be trusted. An operating system manufacturer currently has no way to recall trusted root authority lists that have already been shipped or installed in computer systems.

SUMMARY

Systems and methods are described for distributing trusted certificate authority lists or list updates to computer systems. When a computer system attempts to verify a certificate or a certificate chain, an operating system of the computer system identifies the root authority associated with the certificate and attempts to locate the root authority in a list of trusted roots.

If the root authority is not contained in the trusted roots list, then the operating system automatically checks a trusted roots website to determine if the root authority is listed there. If the root authority is not found on the trusted root website, then the transaction is aborted or the user is given the option to terminate the transaction or continue.

If, however, the root authority is found on the trusted root website, i.e., a digital identifier that is uniquely associated with the root authority is stored on the trusted root website, the digital certificate is downloaded to the computer system. Any time the computer system encounters a certificate issued by the newly downloaded root authority, then the certificate will be validated because the digital certificate of the issuing root authority will be present on the system.

In one implementation, a complete trusted root list is downloaded when the website is accessed. The newly downloaded list is then checked to validate the currently encountered certificate.

In such an implementation, if a root authority becomes untrustworthy, the trusted root is removed from the trusted root list at the website. Any time a system downloads an updated trusted root list after the compromised root authority is removed, a system user will be notified that the root authority may not be trusted when the system encounters a certificate emanating from the compromised root authority.

The user is not burdened by an out-of-band process when an untrustworthy root authority is encountered. As a result, the user's computing experience is unaffected while new root authorities may be added as they become available.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
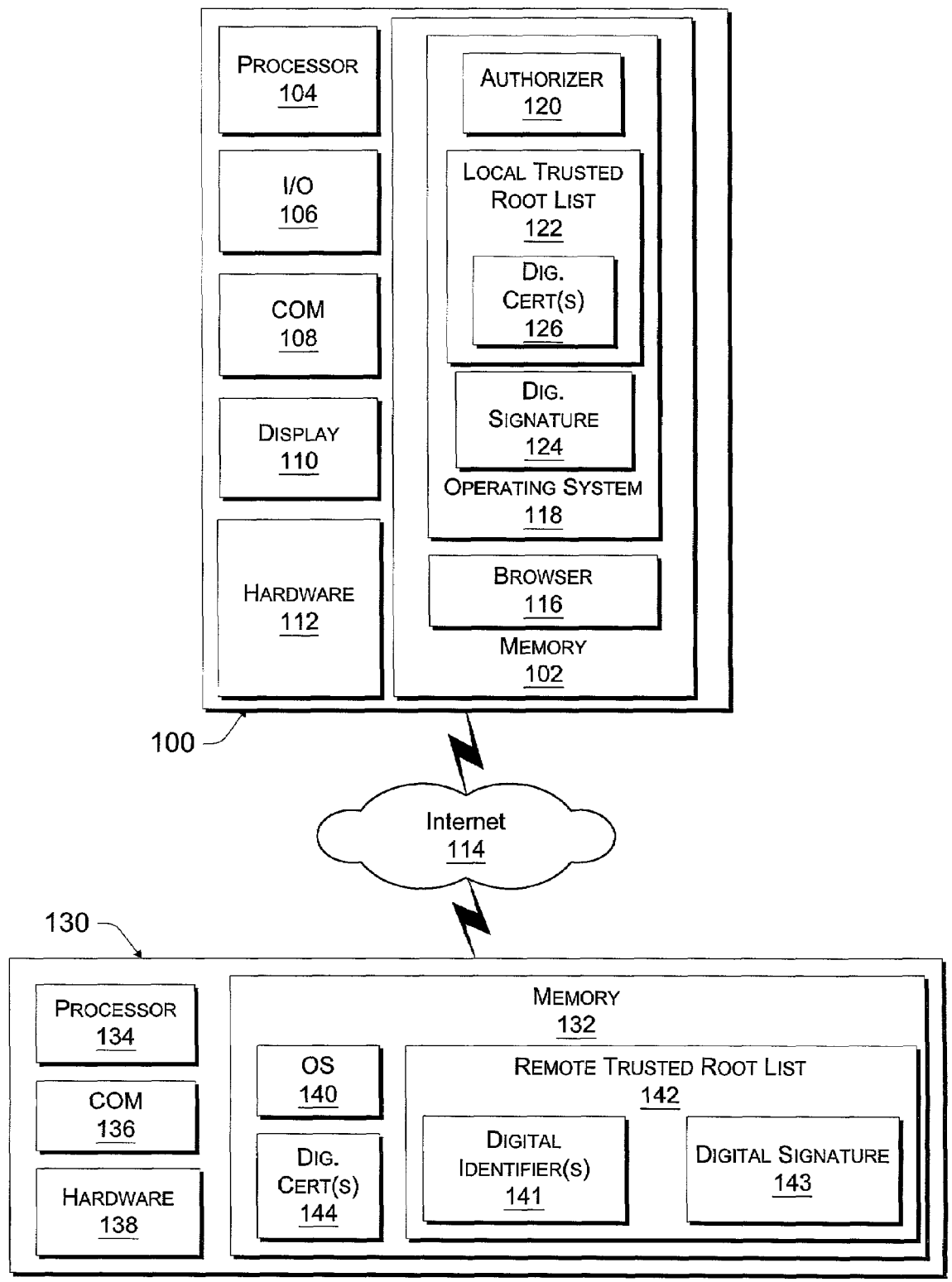
FIG. 1 is a block diagram of a system constructed in accordance with the present invention.

This invention concerns a systems and methods for distributing trusted root certification authorities to computer systems. The invention described herein may be used to update a trusted root list that is already present on a computer system or to add the trusted root list to a computer system that does not already have one stored in the system. The present invention is may at times be described according to a particular implementation. However, it is noted that the features described herein may be applied to any computer system that makes a determination as the whether a digital certificate is one that can be trusted.

Computer-Executable Instructions/Modules

The invention is illustrated in the drawings as being implemented in a suitable computing environment. Although not required, the invention is described in the general context of computer-executable instructions, such as program modules, to be executed by a computing device, such as a personal computer or a hand-held computer or electronic device. Generally, program modules include routines, programs, objects, components, data structures, etc., that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary System

FIG. 1 is a block diagram depicting a computer system 100 constructed in accordance with the present invention. The computer system 100 includes memory 102, a processor 104 and an input/output (I/O) module 106. The I/O module 106 is used to facilitate communications between the computer system 100 and external hardware (not shown) that may be connected to the computer system 100. In this particular invention, the I/O module 106 may not be required.

The computer system 100 also includes a communications module 108, a display 110 and various hardware components 112 that are typically included in computer systems. The communications module 108 is a network card, a modem, or some other component that facilitates communication with remote systems. In the present example described herein, the communications module 108 is used to communicate with the Internet 114 and sites that connect to the Internet 114.

A browser 116 is stored in the memory 102 of the computer system 100. The browser 116 is configured to browse remote network sites, such as sites on the Internet 114 or other networks, including local area networks (LANs), wide area networks (WANs), direct connection to remote systems, and the like.

An operating system 118 is also stored in the memory 102 and is used to control the functional aspects of the computer system 100 and its components. The operating system 118 includes an authorizer 120 and a trusted root list 122. One or more digital certificates 126 are stored in the trusted root list 122. An entity is defined relative to the computer system 100 as a trusted certification authority if the entity possesses a certificate that corresponds to a digital certificate 126 included in the trusted root list 122.

The operating system 118 is digitally signed with a digital signature 124. Digital signatures and their applications are well known in the art and will not be described in detail herein. The digital signature 124 was created by a manufacturer of the operating system to ensure the integrity of the operating system 118.

Although the authorizer 120 and the trusted root list 122 are shown as being a part of the operating system 118, it is noted that the authorizer 120 and the trusted root list 122 may be stored separately from the operating system 118. Similarly, the browser 116 may be an integral part of the operating system 118, although the browser 116 is shown as being a component that is separate from the operating system 118. Generally, it should be understood that the location of the components is not critical, and many components may actually reside at a location other than that shown in FIG. 1.

The computer system 100 is shown communicating with a remote server 130 via the Internet 114. The remote server 130 is a computer system that includes memory 132, a processor 134, a communications module 136 and miscellaneous hardware components 138. Particular hardware and software components that are generally found on computer systems are not shown in the level of detail of FIG. 1. However, it should be understood that such components are assumed to be present in the remote server 130.

The remote server 130 also includes an operating system 140 and a remote trusted root list 142 stored in the memory 132. The remote trusted root list 142 includes one or more digital identifiers 141 and is digitally signed with a digital signature 143. A digital certificate 144 is shown stored in the memory 132 of the remote server 130. It is noted that there may be more than one digital certificate stored in the memory 132, but only one is required to present an appropriate example of the invention. It is also noted that although the digital certificate 144 is shown stored in the memory 132 of the remote server 130, the digital certificate(s) may be stored in the operating system 140, in another portion of memory (not shown) on the remote server 132, or on a different server (not shown). The invention as described herein operates similarly without regard for the location of the storage for the digital certificate(s) 144.

The trusted root list 142 is not necessarily the same as the trusted root list 122 stored in the computer system 100. When the trusted root list 122 stored in the computer system 100 is updated with the trusted root list 142 of the remote server 130, then the two components may be identical. However, the trusted root list 122 of the computer system 100 may always include digital identifiers for authorities specifically identified for the computer system 100. This feature will be described in greater detail, below.

Methodological Implementation: Updating the Trusted Root List

Figure 2:
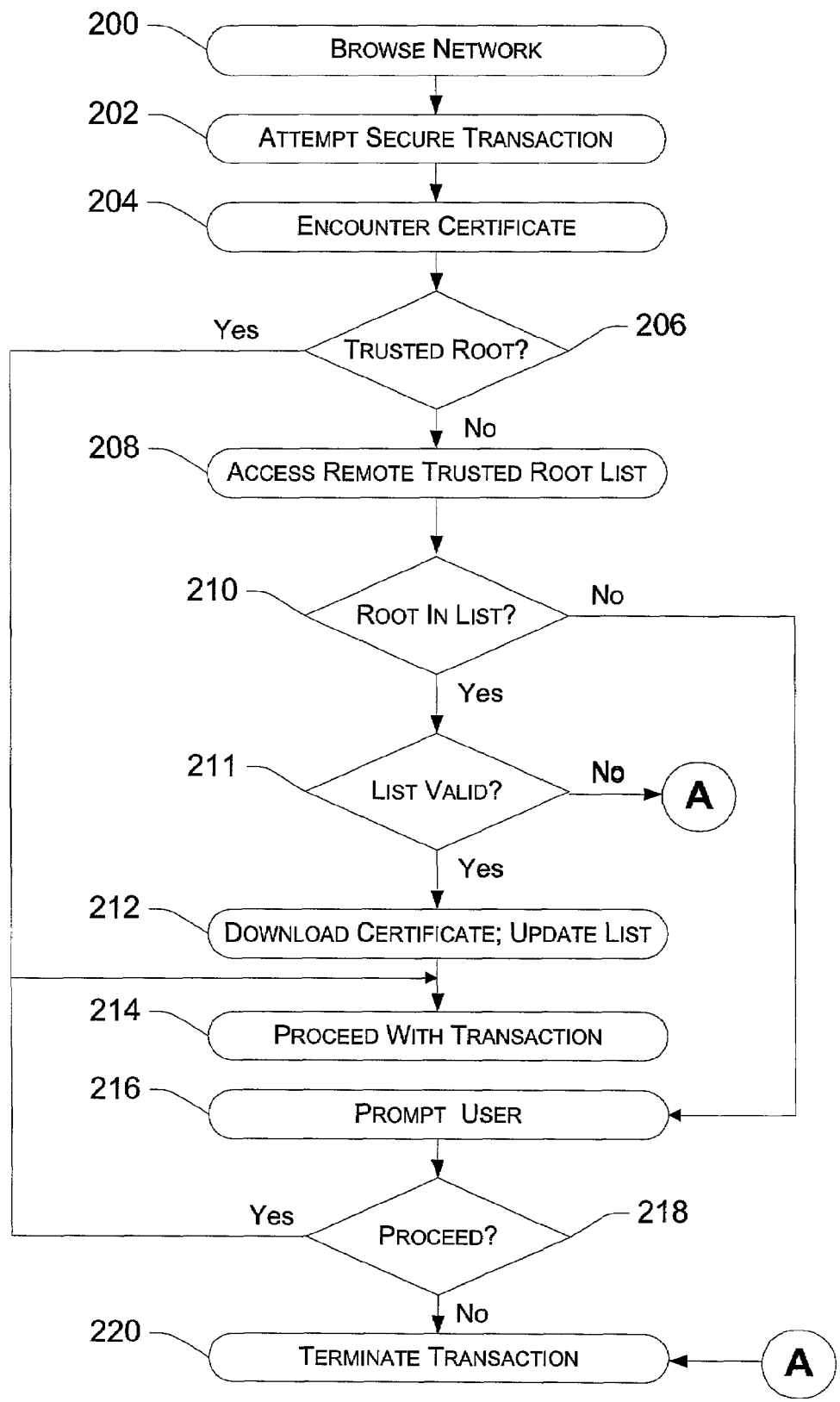
FIG. 2 is a flow diagram of a methodological implementation of distributing trusted root certification authorities.

FIG. 2 is a flow diagram depicting a methodological implementation of updating the trusted root list 122 in the computer system 100. The following discussion is made with continuing reference to the elements and reference numerals included in FIG. 1.

At block 200, the computer system 100 browses the Internet 114 using the browser 116 stored in its memory 102. When a user attempts to carry out a secured transaction (block 202) a digital certificate associated with an entity is encountered at block 204.

At block 206, the authorizer 120 attempts to determine if the digital certificate has been issued from a trusted source, i.e., if the digital certificate can be traced back to being issued by a trusted root certification authority.

After the authorizer 120 determines the root authority identified in the encountered digital certificate, the authorizer 120 examines the trusted root list 122 to see if the root authority is listed therein. In the present example, if the digital certificate 126 is the same as the encountered certificate, then the entity is trustworthy. If the entity is trustworthy ("Yes" branch, block 206), then the browser proceeds with the transaction at block 214. If the root authority cannot be identified in the trusted root list 122 ("No" branch, block 206), then the authorizer 120 accesses the remote server 130 via the browser 116 and the Internet 114 at block 208. An address (not shown) for the remote server 130 is stored somewhere in the memory 102 of the computer system 100, which allows the browser 116 to automatically access the remote server 130.

At block 210, the authorizer 120 examines the remote trusted root list 142 to determine if the root authority of the encountered digital certificate is in the remote trusted root list 142. If the root authority is contained in the remote trusted root list 144 ("Yes" branch, block 210), then the root authority is a trusted root if the integrity of the remote trusted root list 144 can be validated.

The integrity of the remote trusted root list 144 is determined by examining the digital signature 143 of the remote trusted root list 142. If the digital signature 143 identifies the same manufacturer as the digital signature 124 of the operating system 118, then the computer system 100 is assured that the remote trusted root list 142 is authorized as valid by the manufacturer of the operating system 118. If the remote trusted root list 142 is invalid ("No" branch, block 211), then the procedure terminates at block 220.

If the remote trusted root list 142 is validated ("Yes" branch, block 211), then the digital certificate 144 associated with the trusted root is downloaded at block 212. The transaction then proceeds at block 214.

If, the root authority is not identified in the remote trusted root list 142 ("No" branch, block 210), the user is prompted that an untrustworthy certificate has been encountered (block 216). The user is given the option to proceed anyway or terminate the transaction at block 218. If the user chooses to proceed ("Yes" branch, block 218), then the transaction proceeds at block 214. If the user declines to proceed ("No" branch, block 218), then the transaction is terminated (block 220).

After this procedure has occurred, the computer system 100 has only been updated to contain the digital certificate 126 of the previously untrustworthy root authority. If the authority associated with the digital certificate 126 is encountered again, then the authority will be validated and a transaction will proceed without interruption.

Implementation: Periodically Updating the Trusted Root List

In another implementation, the computer system 100 is configured to periodically access the remote server 130 to update the trusted root list 122. Any new trusted roots in the remote trusted root list 142 are added to the trusted root list 122. Any previously trusted roots that are no longer in the remote trusted root list 142 can be removed from the trusted root list 122 of the computer system. In this way, the computer system 100 can better refrain from trusting entities that may have attained their certification from a compromised certification authority.

Exemplary Computer Environment

Figure 3:
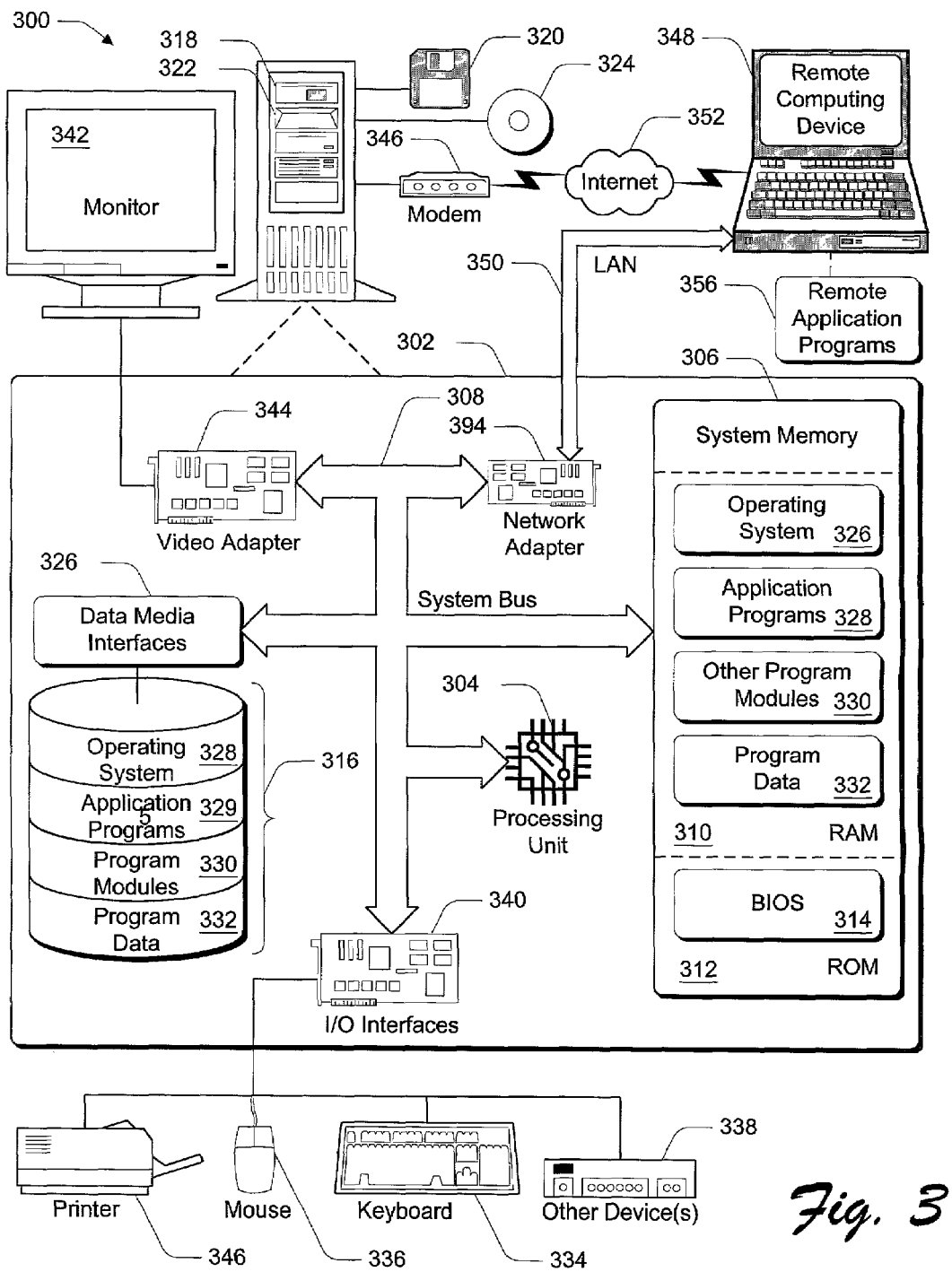
FIG. 3 is a diagram of an exemplary system on which the present invention may be implemented.

The various components and functionality described herein are implemented with a number of individual computers. FIG. 3 shows components of typical example of such a computer, referred by to reference numeral 300. The components shown in FIG. 3 are only examples, and are not intended to suggest any limitation as to the scope of the functionality of the invention; the invention is not necessarily dependent on the features shown in FIG. 3.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 3, the components of computer 300 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 300 typically includes a variety of computer-readable media. Computer-readable media can be any available media that can be accessed by computer 300 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 300 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface such as interface 350.

The drives and their associated computer storage media discussed above and illustrated in FIG. 3 provide storage of computer-readable instructions, data structures, program modules, and other data for computer 300. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 300 through input devices such as a keyboard 362 and pointing device 361, commonly referred to as a mouse, trackball, or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port, or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer may operate in a networked environment using logical connections to one or more remote computers, such as a remote computer 380. The remote computer 380 may be a personal computer, a server, a router, a network PC, a peer device or other common network node, and typically includes many or all of the elements described above relative to computer 300, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets, and the Internet.

When used in a LAN networking environment, the computer 300 is connected to the LAN 371 through a network interface or adapter 370. When used in a WAN networking environment, the computer 300 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 300, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

CONCLUSION

The systems and methods as described thus provide a way to distribute and update trusted root certification authorities. As a result, a computer user can carry out secured transactions with a greater number of network sites without encumbering the user with security details of which an average user is uninformed.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method for distributing a trusted authority list, comprising:

adding an entity as a trusted certification authority by adding, to a trusted authority list, an entity identifier that uniquely identifies the entity;

maintaining the trusted authority list on a server, the trusted authority list containing the entity identifier that uniquely identifies the entity;

maintaining a digital certificate associated with the entity identifier on one or more computer-readable media;

providing access to the trusted authority list through a website to one or more client computers to allow the client computers to automatically access and download the digital certificate, thereby accepting the entity as a trusted authority for the client computers; and for at least one of the client computers, comparing a manufacturer identified by a digital signature corresponding to the trusted authority list with a manufacturer identified by a digital signature corresponding to an operating system of the client computer to verify the integrity of the trusted authority list.

2. The method as recited in claim 1, wherein:

the trusted authority list further comprises more than the first-named entity identifier, each additional entity identifier being uniquely associated with an additional entity that has been identified as being a trusted certification authority;

the maintaining a digital certificate further comprises maintaining a plurality of digital certificates, each digital certificate being associated with one or more additional entity identifiers; and the client computers are configured to download more than one of the digital certificates, thereby accepting each entity having an entity identifier in the trusted authority list as a trusted authority for the client computers.

3. The method as recited in claim 1, further comprising removing an entity as a trusted certification authority by removing an entity identifier associated with the entity from the trusted authority list.

4. A method for updating a trusted certification authority list, comprising:

encountering a digital certificate during a secure transaction;

identifying an entity associated with the digital certificate;

referring to a trusted root list to determine if the entity is trusted to participate in the secure transaction;

when the entity is identified in the trusted root list, proceeding with the secure transaction; and when the entity is not identified in the trusted root list, automatically accessing, with a client computer system attempting the secure transaction and using an address of a trusted root website stored on the client computer system's memory, a remote trusted root list on the trusted root website to:

verify the integrity of the remote trusted root list based upon comparing a manufacturer identified by a digital signature corresponding to the remote trusted root list with a manufacturer identified by a digital signature corresponding to an operating system of the client computer system; and determine when the entity is identified in the remote trusted root list; and proceeding with the secure transaction when the integrity of the remote trusted root list is verified and the entity is identified in the remote trusted root list.

5. The method as recited in claim 4, further comprising downloading a digital certificate associated with the entity when the entity is identified in the remote trusted root list.

6. The method as recited in claim 4, further comprising providing a user option to proceed with the secure transaction when the entity cannot be identified in the remote trusted root list.

7. The method as recited in claim 4, wherein when the trusted root list does not exist, the remote trusted root list is downloaded to become the trusted root list.

8. The method as recited in claim 4, wherein the referring to a trusted root list to determine when the entity is trusted further comprises determining that the entity is trustworthy when an entity identifier uniquely associated with the entity is identified in the trusted root list.

9. A method for updating a trusted authority list on a client computer, comprising:

maintaining a trusted root list on a server computer that is automatically accessible by a plurality of client computers with an address for the server computer stored on each of the client computers, the trusted root list containing one or more entity identifiers, each entity identifier being uniquely associated with an entity that has been identified as a trusted certification authority;

maintaining a digital certificate for each entity having an entity identifier;

transmitting at least one digital certificate to the client computer upon request from the client computer; and wherein the client computer:

automatically accesses the server computer using a browser and the address and requests transmission of the digital certificate when the client computer encounters an entity associated with the digital certificate in an electronic transaction and the client computer does not have information that the encountered entity is trustworthy; and verifies the integrity of the trusted root list based upon comparing a manufacturer identified by a digital signature corresponding to the trusted root list with a manufacturer identified by a digital signature corresponding to an operating system of the client computer.

10. A method for determining when an entity encountered in an electronic transaction can be trusted to handle a secure transaction, comprising:

examining a digital certificate associated with the encountered entity to determine an identity of a certifying authority that issued the digital certificate;

determining whether the certifying authority is identified in a trusted root list;

when the certifying authority is not identified in the trusted root list, automatically accessing a remote trusted root list using an operating system and with an address for a trusted root website having the remote trusted root list;

verifying the integrity of the remote trusted root list based upon comparing a manufacturer identified by a digital signature corresponding to the remote trusted root list with a manufacturer identified by a digital signature corresponding to the operating system;

determining whether the certifying authority is identified in the remote trusted root list; and when the integrity of the remote trusted root list is verified and the certifying authority is identified in the remote trusted root list, proceeding with the secure transaction.

11. The method as recited in claim 10, further comprising downloading a digital certificate associated with the certifying authority when the certifying authority is identified in the remote trusted root list.

12. The method as recited in claim 10, further comprising:

downloading a digital certificate associated with the certifying authority when the certifying authority is identified in the remote trusted root list; and adding an identifier that is uniquely associated with the certifying authority to a local trusted root list.

13. The method as recited in claim 10, further comprising presenting a user option to continue with the secure transaction when the certifying authority is not identified in the remote trusted root list.

14. A system, comprising:

a trusted root list that includes a digital identifier for each of one or more trusted certifying authorities;

an authorizer configured to determine when an entity encountered during an online transaction is a trusted certifying authority by locating a digital identifier in the trusted root list that is associated with the encountered entity; and wherein the authorizer is further configured to automatically access a remote trusted root list from a trusted root website, verify the integrity of the remote trusted root list based upon comparing a manufacturer identified by a digital signature corresponding to the remote trusted root list with a manufacturer identified by a digital signature corresponding to an operating system providing the authorizer, and determine when the digital identifier associated with the encountered entity is identified in the remote trusted root list when the digital identifier is not included in the trusted root list.

15. The system as recited in claim 14, further comprising a browser configured to browse a network and capable of automatically accessing the remote trusted root list using an address for the trusted root website stored on the system.

16. The system as recited in claim 14, wherein the digital identifier included in the trusted root list is associated with a root certification authority that certified the entity or certified a certification authority that ultimately certified the entity as being a trusted certification authority.

17. The system as recited in claim 14, wherein the authorizer is further configured to download a digital certificate associated with the entity and add the digital identifier to the trusted root list when the digital identifier associated with the entity is located in the remote trusted root list but not in the trusted root list.

18. The system as recited in claim 14, wherein the authorizer is further configured to present a user prompt allowing a secure transaction to proceed when the digital identifier associated with the entity is not found in the trusted root list or the remote trusted root list.

19. An operating system, comprising:

a local trusted root list that includes one or more digital identifiers, each digital identifier being associated with a root certification authority that may certify a trusted authority for executing secure transactions over an electronic network;

an authorization module configured to determine when an entity encountered on a network while attempting an electronic transaction can be trusted for a secure transaction by logically connecting a digital identifier associated with the entity with a digital identifier contained in the local trusted root list; and wherein the authorization module is further configured to automatically access a remote trusted root list from a trusted root website when the digital identifier associated with the entity cannot be logically connected to a digital identifier contained in the local trusted root list and to verify the integrity of the remote trusted root list based upon comparing a manufacturer identified by a digital signature corresponding to the remote trusted root list with a manufacturer identified by a digital signature corresponding to the operating system.

20. The operating system as recited in claim 19, wherein the authorization module, in the event that the digital identifier is contained in the remote trusted root list, is further configured to:

download a digital certificate associated with the entity; and add a digital identifier uniquely associated with the entity to the local trusted root list.

21. The operating system as recited in claim 19, wherein the authorization module is, in the event that the digital identifier is contained in the remote trusted root list, further configured to add the digital identifier from the remote trusted root list to the local trusted root list.

22. The operating system as recited in claim 19, wherein the authorizer is further configured to allow the secure transaction to proceed when the digital identifier associated with the entity is included in the trusted root list or the remote trusted root list.

23. The operating system as recited in claim 19, wherein the authorizer is further configured to allow the secure transaction to proceed when the digital identifier associated with the entity can be logically connected to a digital identifier in the trusted root list or the remote trusted root list.

24. The operating system as recited in claim 19, wherein the authorizer is further configured to provide a user option to allow the secure transaction to proceed even when the digital identifier associated with the entity cannot be logically connected to a digital identifier in the trusted root list or the remote trusted root list.

25. One or more computer-readable media containing computer-executable instructions that, when executed on a computer, perform the following steps:

attempting to authorize an entity to participate in a secure transaction by identifying a certification authority in a trusted root list that corresponds to a digital identifier associated with the entity;

when the digital identifier does not correspond with a certification authority included in the trusted root list, accessing, automatically and transparently to a user associated with the secure transaction, a remote trusted root list from a trusted root website;

verifying the integrity of the remote trusted root list based upon comparing a manufacturer identified by a digital signature corresponding to the remote trusted root list with a manufacturer identified by a digital signature corresponding to an operating system of the computer;

attempting to locate a certification authority that corresponds with the digital identifier associated with the entity in the remote trusted root list;

when the certification authority is found, proceeding with the secure transaction automatically and transparently to the user.

26. The one or more computer-readable media as recited in claim 25, further comprising the step of presenting an option to the user to proceed with the secure transaction when the certification authority is not found in the remote trusted root list.

27. The one or more computer-readable media as recited in claim 25, wherein the secure transaction is terminated when the certification authority is not found.

28. The one or more computer-readable media as recited in claim 25, wherein the certification authority is represented in the trusted root list by a digital identifier.

29. The method as recited in claim 4, wherein the method is performed by the client computer system and the act of automatically accessing is performed by a browser using the address stored in the client computer system's memory.

30. The method as recited in claim 4, wherein the method is performed by the client computer system and the act of automatically accessing is performed by an operating system using the address stored in the client computer system's memory.

31. The method as recited in claim 4, wherein the method is virtually transparent to a user of the computer system.

* * * * *